United States Patent [19]

Cosserat et al.

[11] 3,757,307

[45] Sept. 4, 1973

[54] PROGRAM INTERRUPT FACILITIES IN DATA PROCESSING SYSTEMS

[75] Inventors: David Cockburn Cosserat, London, S.W. 10; John Michael Cotton, Windsor, Berkshire; Michael O'Halloran, Maidenhead, Berkshire; Frederick Mackay Trapnell, London, W. 11, all of England

[73] Assignee: Plessey Handel Und Investments A.G., Zug, Switzerland

[22] Filed: Aug. 31, 1971

[21] Appl. No.: 176,464

[30] Foreign Application Priority Data

Sept. 2, 1970 Great Britain .................. 41,951/70

[52] U.S. Cl. .......................................... 340/172.5
[51] Int. Cl. .......................................... G06f 9/18
[58] Field of Search .................. 340/172.5; 235/157

[56] References Cited

UNITED STATES PATENTS

| | | | |
|---|---|---|---|
| 3,421,150 | 1/1969 | Quosig et al. | 340/172.5 |
| 3,614,740 | 10/1971 | Delagi et al. | 340/172.5 |
| 3,541,520 | 11/1970 | Mullery et al. | 340/172.5 |
| 3,523,283 | 8/1970 | Cohen et al. | 340/172.5 |
| 3,483,521 | 12/1969 | Frasier et al. | 340/172.5 |
| 3,374,465 | 3/1968 | Richmond et al. | 340/172.5 |
| 3,312,951 | 4/1967 | Hertz | 340/172.5 |

*Primary Examiner*—Paul J. Henon
*Assistant Examiner*—Mark Edward Nussbaum
*Attorney*—Scrivener, Parker, Scrivener & Clarke

[57] ABSTRACT

An arrangement for providing a program interrupt facility for use in a modular data processing system which includes at least one processor module, a memory comprising at least one storage module, at least one peripheral unit and a communication medium providing intercommunication between the memory and the processor and a plurality of control programs. The memory includes a discrete common storage area for the storage of a plurality of system interrupt demand bits and the arrangement is such that a discrete system interrupt demand bit is marked when a processor or peripheral unit requires to generate a system interrupt and each processor module is adapted to periodically inhibit the operations or an object program and to interrogate the state of the system interrupt demand bits in the memory. Upon detection of a marked demand bit the interrogating processor is arranged to suspend the processing of the inhibited object program and to enter an interrupt handler program.

8 Claims, 8 Drawing Figures

PROGRAM INTERRUPT FACILITIES IN DATA PROCESSING SYSTEMS

Figure 1:
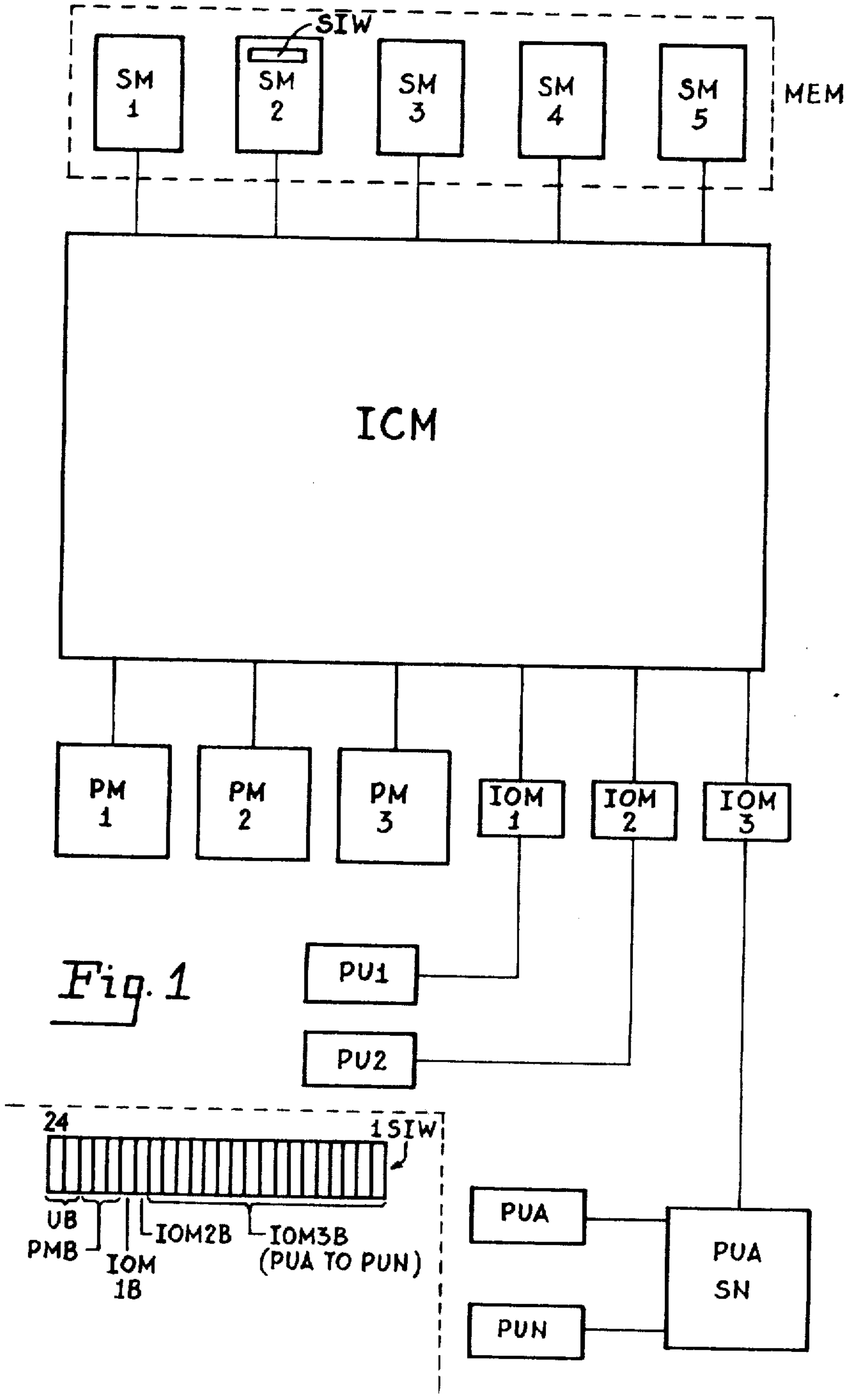

The present invention relates to so-called program interrupt facilities for use in data processing systems and is more particularly concerned with the provision of such facilities in so-called modular data processing systems.

Modular data processing systems consist basically of one or more processor modules, one or more input-output modules to which one or more peripheral devices may be connected, a memory unit (which may also be of modular form employing a number of storage modules) and a data transfer interconnection medium allowing intercommunication between the modules and the memory. Such systems are ideally suited to certain control functions, for example the stored programme control of automatic telecommunication exchanges, as they are inherently flexible from an expansion point of view. The data processing system, when employing the modular approach, is easily expandable by the incorporation of additional modules of the required type and the consequent extension of the intercommunication medium. However, in many prior art modular systems the arrangements provided in the processor modules for the interrupt facility requires the connection of a number of interrupt signal leads to all the processor modules. In such modular systems the introduction of an additional processor module not only requires an extension of the intercommunication medium but also the system interrupt signal leads must be extended to the new processor module. Also the addition of new or extra peripheral devices may require the addition of more interrupt signal leads to all the existing processor modules.

It is the object of the present invention to provide an interrupt facility for incorporation of a modular data processing system which alleviates the above mentioned problems.

According to the invention there is provided a programme interrupt arrangement in a data processing system, said data processing system including at least one processor unit, a memory (including at least one storage module), at least one peripheral unit and a communication medium providing intercommunication between said memory and said processor and peripheral units, said memory storing a plurality of object programmes and a plurality of control programmes characterised in that said memory includes a discrete common storage area for the storage of a plurality of system interrupt demand indicating bits, said arrangement being such that a discrete system interrupt demand bit is marked when a processor or peripheral unit requires to generate a system interrupt and each processor unit is adapted to periodically inhibit the operations on a current programme and to interrogate the state of said system interrupt demand bits in said memory and upon detection of a marked demand bit the interrogating processor is arranged to suspend the processing of said inhibited current programme and to enter a particular control programme.

According to a first feature of the invention there is provided a programme interrupt arrangement in which said memory also includes a plurality of dedicated local storage areas each of which is particular to one of said processor units, each dedicated local storage area in said memory including storage for a programme settable interrupt accept bit mask (defining the interrupt demands which are currently to be acceptable to the particular processor unit), said arrangement being such that said interrogating processor unit is arranged to compare the states of said system interrupt demand indicating bits with the states of said interrupt accept bit mask to ascertain if any of said interrupt demand bits currently acceptable to said interrogating processor are marked prior to the suspension of the operations on said inhibited current programme.

According to a second feature of the invention there is provided a programme interrupt arrangement in which each processor unit is provided with a specific register which is arranged to store an interrupt accept word and said arrangement is such that said interrogating processor unit computes a code corresponding to one of said acceptable interrupt demand bits which is marked and said code is placed in said specific register.

According to a third feature of the invention there is provided a programme interrupt arrangement in which said arrangement is such that said interrogating processor unit is arranged to reset the marked bit in said discrete common storage area corresponding to the code placed in said specific register.

According to a fourth feature of the invention there is provided a programme interrupt arrangement in which said arrangement is such that said interrogating processor is arranged to be exclusively connected to the storage module in which said discrete common storage area resides for a period commencing with the inhibition of the operations on said object programme and terminating immediately after the resetting of the accepted marked demand bit.

According to a fifth feature of the invention there is provided a programme interrupt arrangement in which said local storage area includes information which directs the interrogating processor to the start of said interrupt handler control programme which is commenced by said interrogating processor after the dumping of the parameters for the suspended object programme.

According to a sixth feature of the invention there is provided a programme interrupt arrangement in which each processor unit is provided with a pair of registers which are arranged to store a real-time count which is periodically up-dated, a first of said registers being arranged to store a count indicative of the length of time the current programme has been being processed while a second of said registers is arranged to store a count indicative of the length of time elapsed since a particular control operation was performed and said processor modules are arranged to generate an immediate interrupt demand when either of said registers reaches a predetermined state of count.

Figure 2A:
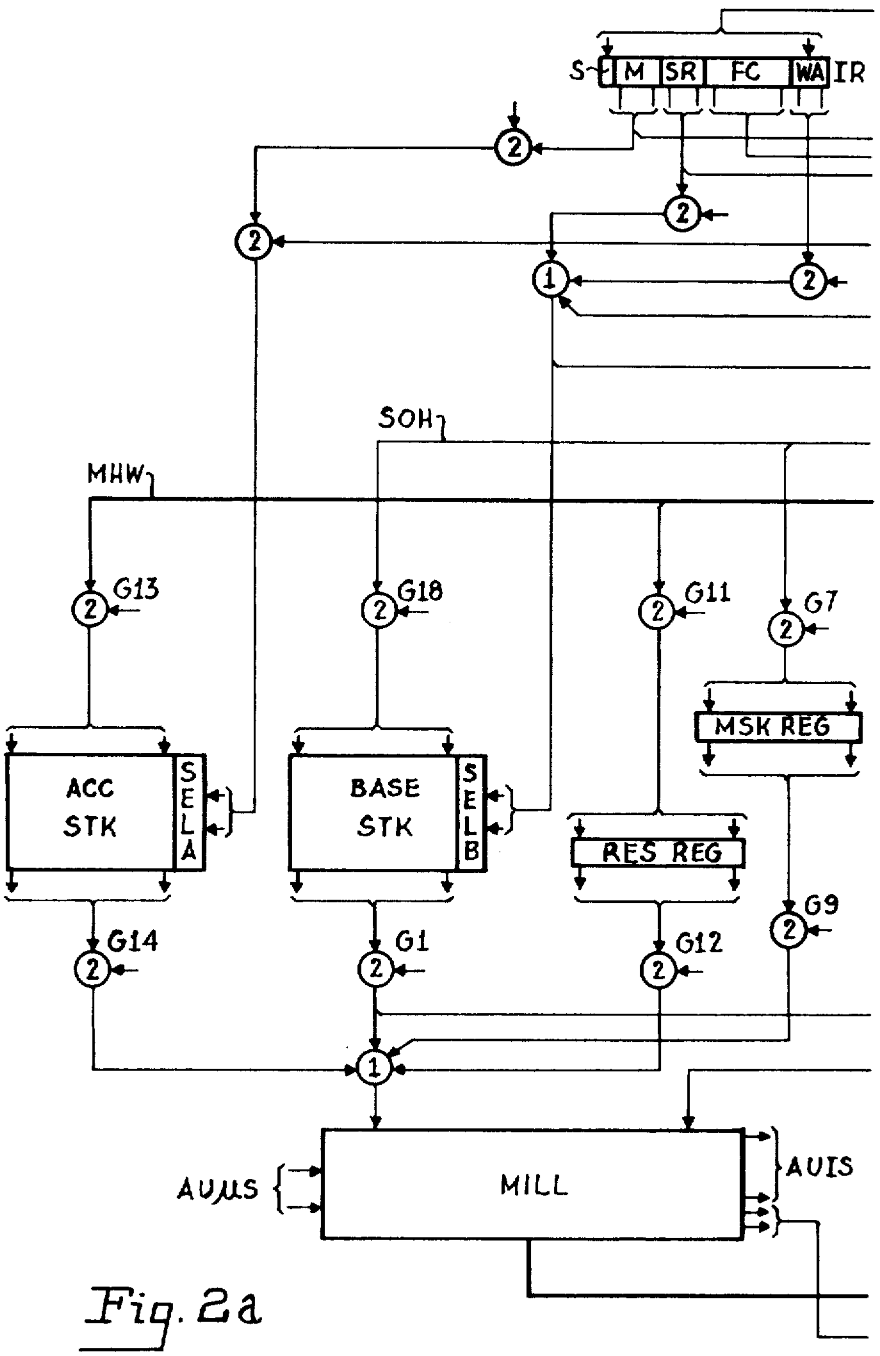
Figure 2B:
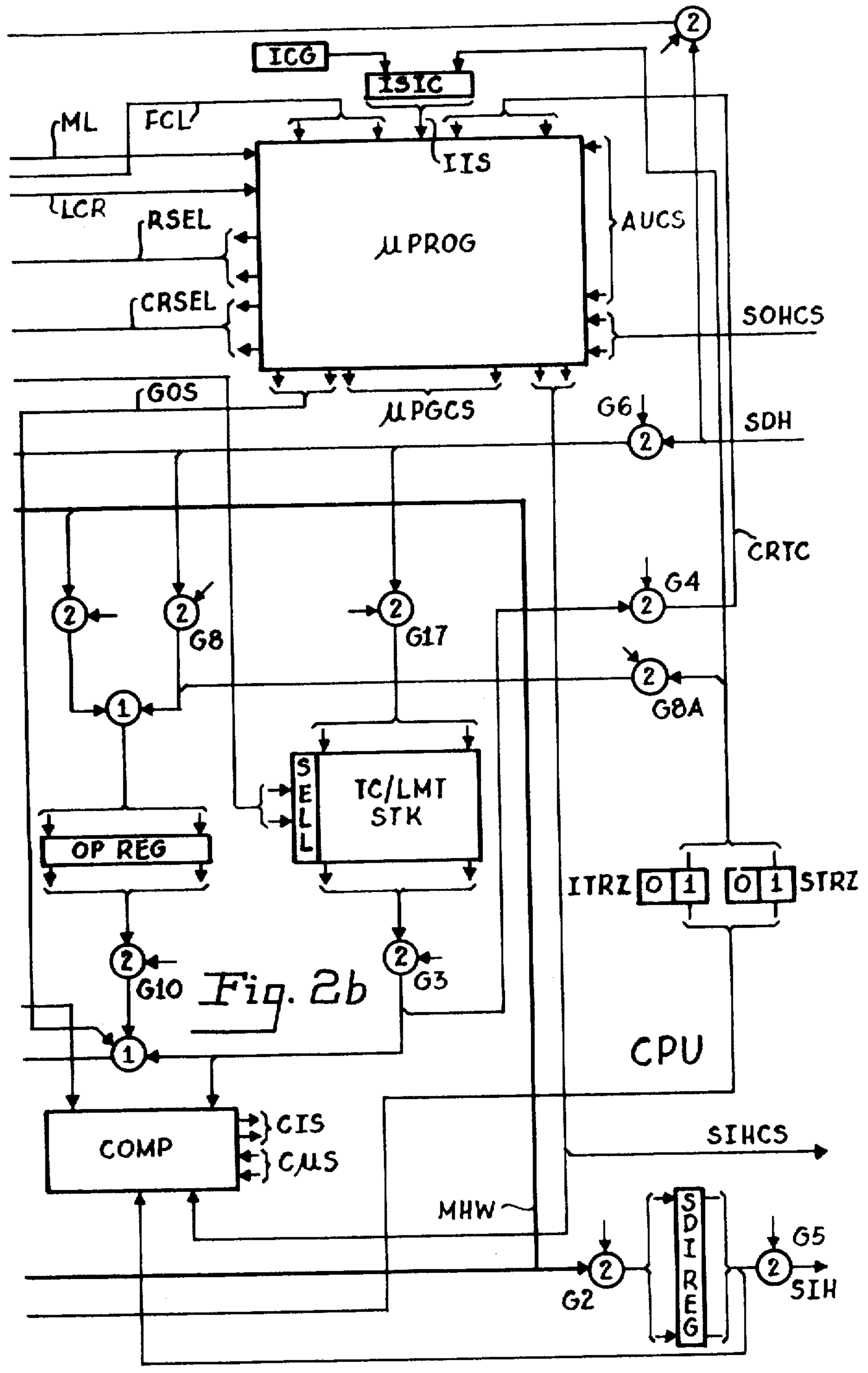
Figure 3:
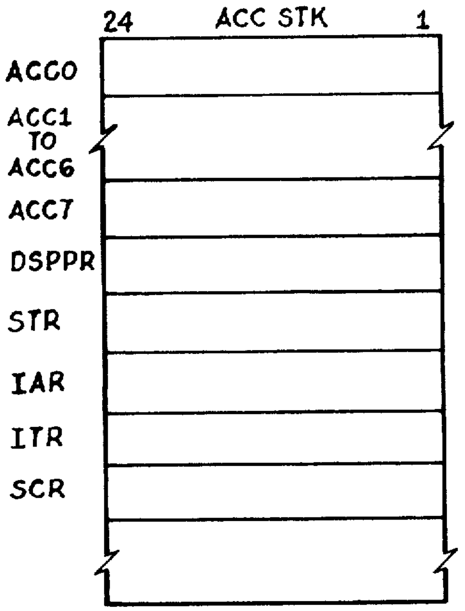
Figure 4:
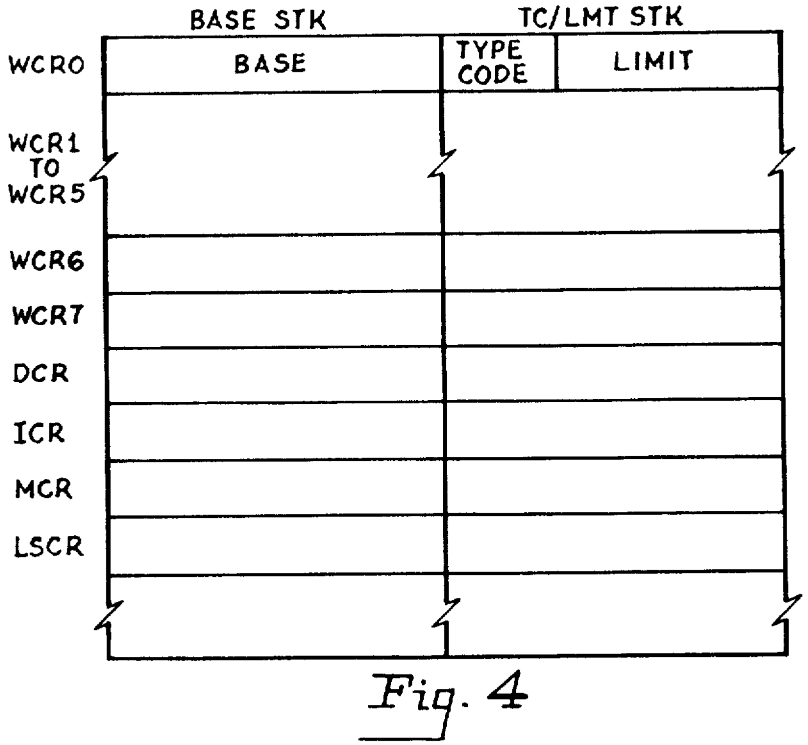
Figure 5:
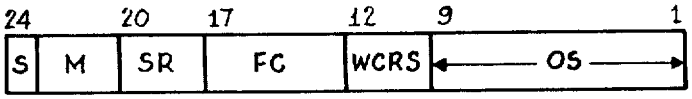
Figure 6:
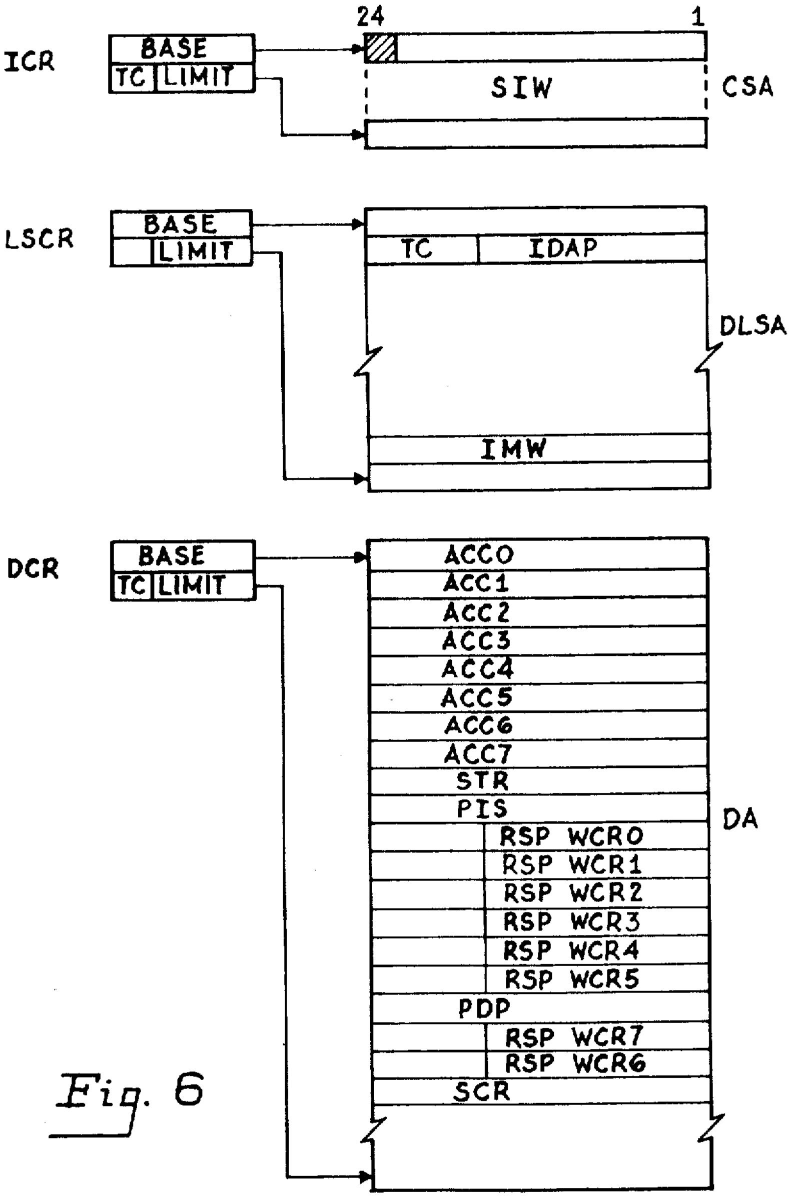
Figure 7:
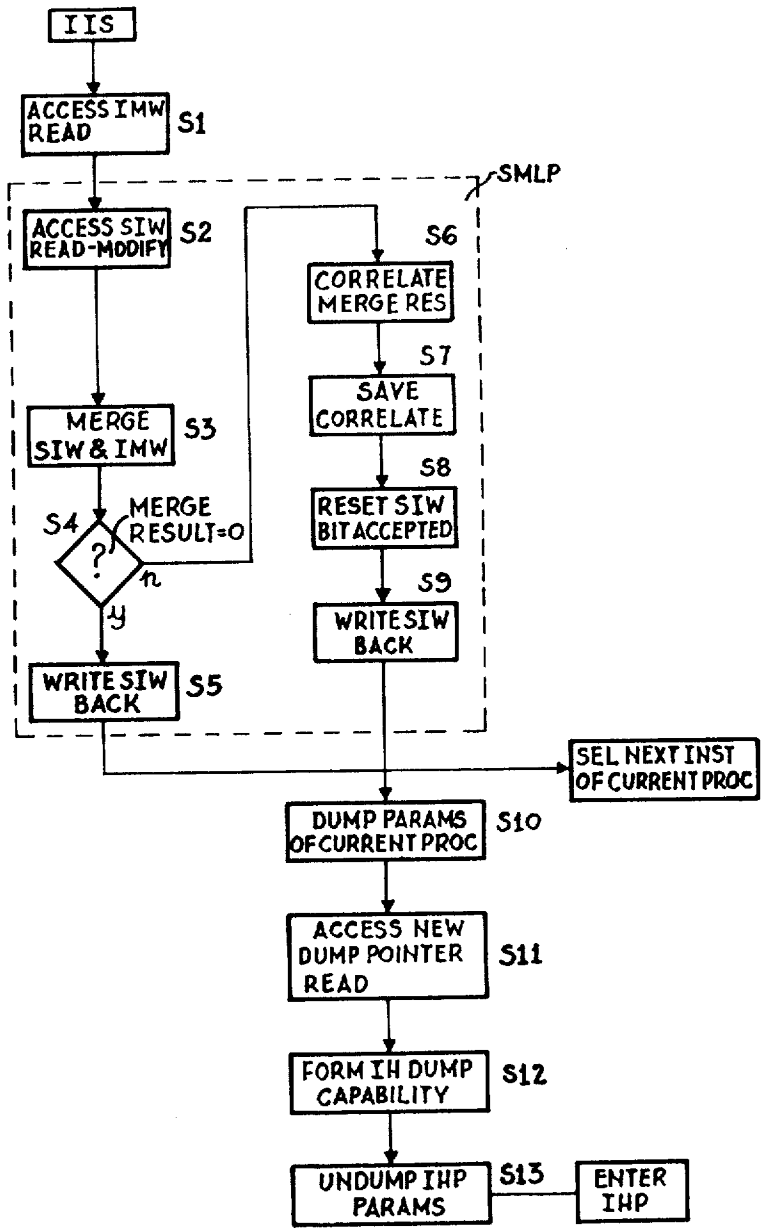

The invention together with its various features will be more readily understood from the following description of one embodiment which should be read in conjunction with the accompanying drawings. Of the drawings:

FIG. 1 shows a simplified block diagram of a typical modular data processing system to which the invention may be applied, FIG. 2*a* and 2*b* when placed side by side show a block diagram of a processor module or unit incorporating the invention, FIG. 3 shows the layout of the so-called accumulator stack in the processor module, FIG. 4 shows the layout of so-called capability register stacks within the processor module, FIG. 5 shows a typical instruction word format for the processor module, FIG. 6 shows the significance of the segment descriptors held in the capability registers of the processor which are of importance to the specific embodiment of the invention, while FIG. 7 shows a flow diagram of the operations performed in response to an interrupt condition in accordance with the specific embodiment of the invention.

GENERAL DESCRIPTION

Referring firstly to FIG. 1 brief consideration will be given to a typical modular data processing system. The system consists of a memory MEM, including a number of storage modules SM1 to SM5, a number of processor units or modules PM1 to PM3 and a number of input-output modules IOM1 to IOM3, which serve the peripheral units PU1, PU2 and PUA to PUN, together with an intercommunication medium ICM for memory to processor/input-output module communication. The actual quantities of the various modules shown in FIG. 1 is typical only and they are not intended to be limiting in any way to the present invention. The input-output modules IOM1 to IOM3 may be arranged to serve a single peripheral unit (such as PU1) or, by way of a peripheral unit access switching network PUASN, a plurality of peripheral units (such as PUA to PUN) on a time sharing basis.

Each processor module may be connected by the intercommunication medium ICM to any of the storage modules SM1-5 and the memory MEM provides storage for all object and control programmes and working and permanent data therefor. While performing a programme a processor module is arranged to extend a demand to the intercommunication medium ICM indicative of the memory address required and the intercommunication medium ICM time-shares the access demands to the various storage modules. The input-output modules IOM1 to IOM3 are also able to gain access to the memory for the interchange of information between particular memory areas and the peripheral units.

Included in the memory MEM is a common storage area, which may consist of a number of words, for use as a system interrupt word SIW. This word is shown as being resident in storage module SM2, however, it should be realised that any storage module may be used as long as all the processors and all the input-output modules are aware of the storage module used. The system interrupt word SIW, which is shown in the inset in the left hand lower corner of FIG. 1, typically may consist of a single 24 bit word. The two most significant bits (bits 23 and 24) of the system interrupt word, referenced UB, are not used as active bits the significance of which will be seen later. The remaining bits, bits 1 to 22 in the chosen case of a 24 bit word, are used as dedicated processor or input-output module interrupt demand bits. In the example chosen bits 20 to 22 collectively referenced PMB are allocated to processor modules PM1 to PM3 while bits 18 and 19 are allocated to input output modules IOM1 and IOM2 and the remaining bits are allocated for use by input-output module IOM3. By the above arrangement the bits of the system interrupt word may be set (or marked) when any of the processor modules or any of the peripheral equipments requires to generate a system interrupt. The arrangement of allocating a particular bit to each peripheral is again typical only, arrangements may be provided for all IOM's to have access to all peripheral devices for example by way of a peripheral unit access switching network which has multiple ports on both sides. In such a case the system interrupt bits would be allocated on a strict IOM basis and the IOM which handled a data transfer would either have information in it to indicate the destination and origin of the transfer or information would be placed in an IOM administration area of the memory indicative of the transfer which had taken place.

From the above it can be seen that the provision of a system interrupt word SIW allows any of the processor or input-output modules to "signal" to the system that it requires an interruption of the normal processing to be performed. Basically a processor would generate an interrupt demand signal when for example it has completed a particular operation, or a particular critical time period has elapsed or the time allocated for the processing of a particular function has elapsed or the processor has encountered a fault condition (i.e. in any situation where it is necessary for one of the other processors or itself to change the current processing configuration of the system). The input-output modules, however, are arranged to mark the correspnding system interrupt bit when they have completed a peripheral transfe or when a fault has occurred in the course of such a transfer. If an output type peripheral transfer has been performed the marking of the corresponding system interrupt word bit will be interpreted, by an interrupt handler control programme, as indicating that a block of storage has been extracted from the memory MEM and has been placed in the required peripheral whereas the marking of the corresponding bit in connection with an input type peripheral transfer will indicate that a block of storage in the memory has been filled with information from a peripheral.

Each of the processor modules is arranged to include an interrupt cycle generator which causes periodic interrogation of the system interrupt word to be performed. The interrupt cycle generators in the processor modules are not synchronised with each other allowing all the processor modules to interrogate the system interrupt word SIW in the memory quite independently of and asynchronously to any other processor module.

By the provision of the system interrupt word and the periodic interrogation of this word by the processor modules it is possible to realise an interrupt system, as far as input-output transfers are concerned, which avoids time-critical interrupt conditions. When a status change occurs in a peripheral device or when a transfer is complete the input-output module sets its bit in the system interrupt word, thereby bringing the status change to the attention of one of the processors (i.e. the next processor to interrogate that word). Hence there is no need to provide any of the processor modules with specific input-output instructions as the data transfer during an input-output operations is handled autonomously. Further no active device (processor or input-output module) is tied electrically to interrupt lines. The only link between modules for the handling of interrupts is the System Interrupt word which can be held in any area of any storage module of the common memory.

When a processor accesses the system interrupt word SIW it scans the word and if it finds any bit marked the processor immediately suspends the current programme operations and transfers control to the interrupt handler control programme. Additionally each processor is provided with a small section of dedicated storage in the memory and these sections are used to store a link to the interrupt handler programme and an interrupt accept mask. By means of the mask it is possible for certain processors to be prevented from servicing certain interrupts so that with a minimum of fast and efficient hardware it is possible to realise a software control of a number of interrupt philosophies to suit the modular system configuration. The actual operation of a processor when accepting an interrupt demand will be seen from the following detailed description of the facilities built into a typical processor module.

Processor Module Description

FIGS. 2*a* and 2*b* which should be placed side-by-side with FIG. 2*b* on the right show the relevant details of a typical processor module which incorporates equipment for the performance of the invention. The processor module is ideally suited for inclusion in a modular data processing system as it is organised on a system of so-called capabilities in which the data held in the memory is divided into segments and each segment is defined by a base and limit code. The system of so-called capabilities is described in Professor M.V. Wilkes book "Time-sharing Computer systems" the second edition of which was published in 1969 by American Elsevier Publishing Company, Inc. and the actual organisation of the particular processor module is disclosed and claimed in co-pending British application No. 25245/70. All the various types of data held in the memory are structured on a segment basis so that the segment descriptors refer to many different types of segment (i.e. programme segments, working data segments, read-only data segments, capability file segments, and the like).

The processor module CPU consists of an instruction register IR, a register stack of accumulator/working registers ACC STK, a result register RES REG, a mask register MSK REG, an operand register OPREG, a microprogramme control unit μPROG, an arithmetic unit MILL, a data comparator COMP, a store data input register SDIREG, a pair of memory protection register stacks BASE STK and TC/LMT STK and an interrupt status interrogation trigger circuit ISIC. Typically the three register stacks (ACC STK, BASE STK and TC/LMT STK) may be constructed using so-called scratch-pad units and these scratch-pad units are provided with line selection circuits (SELA, SELB and SELL respectively) which control the connection of the required "register" to the input and output paths of the stack.

The processor module CPUT is organised for parallel processing, although for ease of presentation the various data paths have been shown as a single lead in FIGS. 2*a* and 2*b*. The CPU is provided with a so-called main highway MHW, a store input highway SIH and a store output highway SOH. Each of these highways is typically of 24 bits corresponding to the size of a memory word. The memory is not shown in FIG. 2 and it is to be assumed that the CPU is connected over an intercommunication medium to a bank of storage modules by way of the store output highway SOH and the store input highway SIH as shown in FIG. 1. Both these highways are provided with related store control signal highways SOHCS and SIHCS respectively which are used to carry control signals between the memory and the processor module.

Associated with the various highways are a number of micro-programme signal controlled AND gates such as G6 (i.e. those gates which include a number 2 inside them). It must be realised that many of the gates shown will in practice consist of 24 gates one for each lead in the 24 bit highway and these gates are activated under micro-programme control to allow the data on the various highways to be written into selected registers as required. AND gating, such as gate G3, is also provided on the output of the registers and register stacks allowing selective connection of the various registers to the input ports of the arithmetic unit MILL. Also shown in FIG. 2 are a number of OR gates (i.e. those gates which include a number 1 inside them), these gates are simply used for isolation purposes allowing two or more signal paths to be ORed into one input path.

Accumulator stack ACC STK

This scratch-pad unit is used to provide a number of accumulator registers (ACCO–ACC7 which may also be used as mask registers or modifier registers) and the required one of these registers may be selected either under micro-programme control or instruction word control field bits control. Also included in the accumulator stack ACC STK is the sequence control register (SCR) and additional registers such as a scheduler time clock register (STR), an interval timer register (ITR), an interrupt accept word register (IAR) and a "dump stack push-down pointer" register (DSPPR). These latter group of registers are only selectable under micro-programme control or by special instruction and they will be considered in more detail later. FIG. 3 shows the layout of the registers in the accumulator stack ACC STK. The required register for any operation is selected by passing a selection code to the scratch pad unit selection circuit SELA.

Base register Stack BASE STK

This scratch-pad unit is used to provide a number of "half" capability registers for the CPU. It was stated above that the memory protection system incorporates a number of so-called capability registers each of which holds a segment descriptor consisting of a base address, a limit address and a permitted access type code. The base register stack holds the base addresses for all the capability registers. FIG. 4 on the left-hand side shows the half capability registers held in this stack and they consist of eight so-called "work-space capability" registers WCRO to WCR7 and a number of so-called "hidden" capability registers. Only four of the "hidden capability" registers are shown (DCR, ICR, MCR and LSCR) in FIG. 4 as these are the only registers which are of importance in the understanding of the present invention. The "workspace capability" registers are selectable by selection codes in the machine instruction register IR and by micro-programme control signals while the hidden capability registers are only selectable by special instruction word control codes and by micro-programme generated selection codes.

The "work-space capability" registers are used to hold segment descriptors which define some of the working areas of the memory to which the current processor module requires access. One or more of the work-space capability registers is used to hold a segment descriptor which is defined as a "reserved segment pointer table" and by convention the main reserved segment pointer table for the current programme is defined by the segment descriptor held in WCR6. The significance of this main reserved segment pointer table will be more readily understood by reference to co-pending British application No. 25245/70 and briefly it is used to store a file of pointers which relate to a master capability table holding the base and limit addresses of all the segments currently resident in the memory. The reserved segment pointer table for any process constitutes a list of pointers to the segments which the particular process (i.e. programme) is to be allowed access. The mode of access (i.e. permitted access type code) for each segment is also held in the pointer table. Also by convention workspace capability register WCR7 is arranged to hold the segment descriptor for the segment holding the instruction words for the currently running programme block.

The "hidden capability" registers are used to hold segment descriptors which define the "administration" segments. Capability register DCR is the dump area capability register defining the segment into which the parameters of the currently running programme are to be dumped when the operations on this programme are suspended. Capability register ICR defines the storage area in which system interrupt word (SIW) resides, which is to be accessed in the interrupt operations. Capability register MCR defines the segment in which the master capability table is located while capability register LSCR defines a so-called "local start-up" segment for the particular processor. The significance of all these segments and their segment descriptors will be seen later when considering the detailed operation of the interrupt system.

Each base address of a capability register indicates (a) the store module (8 bits) in which the segment is located and (b) the base or start address of that segment within the storage module (16 bits).

Type code/limit Stack TC/LMT STK

This stack provides the other "half" of the capability registers and it is shown on the right-hand side of FIG. 4. Each capability register is formed by a corresponding line in both the base stack and the limit stack. The limit address is 16 bits in length as it is not necessary for the same module address held in the corresponding base address part of the capability register to be repeated. The eight bits are used to store the type code for the descriptor.

Result register RES REG

This register is fed from the processor module main highway MHW and may be used to temporarily store the result of an arithmetic operation.

Mask registers MSK REG

This register is fed from the memory output highway SOH and will be used later to store the interrupt accept mask from the local start-up area when performing an interrupt interrogation operation.

Operand register OPREG

This register may be fed from either the main highway MHW or the memory output highway SOH and it is used as an intermediate register in the formation of a store access address. The offset address of an instruction word is fed into this register when an instruction word is fetched from the memory.

Instruction register IR

This register is used to hold the control bit fields of an instruction word when fetched from the memory. The significance of the various fields will be discussed later in the execution of a specific instruction in connection with the interrupt handler control programme.

Micro-programme unit $\mu$PROG

This unit which may typically include a read-only memory controls the sequencing of the performance of the operations of the processor module by the issuance of timed and sequenced control signals ($\mu$PGCS) to the various input and output gates of the registers and the arithmetic unit MILL (leads AU$\mu$S) and the comparator COMP (C$\mu$S). The micro-programme unit is also able to select various registers over leads RSEL and CRSEL and it generates control codes for passage to the memory over the memory access control signal highway SIHCS in accordance with the accessed segment descriptor type code. Various internal control signals are also fed to the micro-programme unit indicative of various conditions and indicators which are active within the processor at any one time. These signals are grouped together under the reference of AUCS. The store output control signal highway SOHCS, which provides control codes to accompany the data passed on the store data highway SDH, is also connected to the micro-programme unit.

Arithmetic unit MILL

This unit is a conventional arithmetic unit capable of performing parallel arithmetic on the data words presented over its two input ports. The result of a MILL operation is presented over the main highway MHW to a micro-programme defined destination. The actual operations performed by the MILL are defined by the arithmetic unit micro-programme control signals AU$\mu$S. The MILL also includes a fast-shift circuit and a correlate circuit the significance of which will be described later.

Comparator COMP

This unit is used to compart the address loaded into the memory data input registers SDIREG and the access operations required, with the bounds (i.e. base and limit) and permitted access code of the segment descriptor relevant to the memory access. Its condition indicating output signals CIS are fed to the micro-programme unit $\mu$PROG as part of the arithmetic unit condition signals AUCS. The significance of the comparator's function will be evident later.

Memory data input register SDIREG

This register acts as the "CPU to memory" output register and the data for passage to the memory is assembled in this register prior to its passage thereto over the memory input highway SIH.

Interrupt status interrogation trigger circuit ISIC

This circuit acts as the trigger circuit for the inhibition of the operations on the current process (e.g. object programme) and the control for the interrogation of the system interrupt word. As mentioned previously the system interrupt word interrogation processes is initiated on a periodic basis under the control of an interrupt clock generator ICG. This generator is arranged to activate the interrupt status interrogation trigger circuit on say a 100 $\mu$Second cycle. The trigger circuit is arranged to arrest the 100 $\mu$ second pulse until the processor module has completed the current instruction step. The trigger circuit is also activated asynchronously by the setting of either of the "timer register zero" toggle STRZ or ITRZ. These toggles are set when the MILL detects a zero count in the scheduler timer register STR or the interval timer register ITR. These two latter conditions are defined as "internal interrupts" while an accepted interrupt as a result of a 100 $\mu$ Second pulse is considered to be a "system interrupt".

Each process (object programme) is provided with a scheduler timer count which is indicative of the total processing time that that object programme should experience before entry into the scheduler programme is performed. This arrangement insures that a background programme, which may be quite lengthy, does not monopolise the processing time at the expense of other programmes. Each time a programme is suspended the setting of the scheduler timer register STR is written into the parameter dump area for that process.

The interval timer register ITR is used to time critical time periods. It is set to a particular state of count at the start of the time period and periodically decremented. Typically in an automatic telephone exchange control environment the interval timer could be used to provide timing for say impulse transmission.

Typically the impulse sending programme would be suspended after instructing the "telephone-line supervisory set" to open the line loop and the interval timer register would be filled with a count corresponding to 66⅔ milli seconds. The interval timer register ITR is then periodically decremented at a standard rate (e.g. every third of a milli-second) and when it reaches zero the "interval-timer-register-zero" toggle ITRZ will be set. This allows an interrupt to be performed to return to the suspended impulse sending programme so that the line supervisory set may be instructed to close the line loop. The interval timer register will then be filled with a 33⅓ milli second count for timing of the "make".

Consideration will now be given to the functioning of the processor module in the performance of system interrupt word interrogation.

Interrupt Word Interrogation operations

When a 100 $\mu$ second pulse occurs (system interrupt interrogate required) or when either of the timer registers have reached zero (internal interrupt generated) the processor module completes its current instruction operation and then the micro-programme unit $\mu$PROG receives a signal IIS from the interrupt status interrogation trigger ISIC. This condition is the start point for the interrupt interrogation process, the flow diagram for which is shown in FIG. 7. The following description will be sectionalised under the steps performed in the execution of the flow diagram of FIG. 7, however, frequent reference will be made to FIGS. 2*a* and 2*b* for the operations performed by the processor module in the execution of the flow diagram operations. FIGS. 3, 4, 5 and 6 will also be referred to from time to time to aid the understanding of the operations.

Step S1 – Access IMW Read

Upon the completion of the current instruction step the micro-programme unit $\mu$ PROG (FIG. 2*b*) accepts the active IIS signal and effectively inhibits the further processing of the current programme. It should be noted at this stage that the processor module is organised such that at the end of each instruction step the three hardware registers RES REG, MSKREG and OPREG contain information which is no longer required. Any information contained therein in the course of an instruction step which is to be retained for the next instruction step of the process would be copied into one of the accumulator stack ACC STK locations.

The microprogramme unit $\mu$ PROG causes a memory access to be made to read the interrupt accept bit mask IMW from the processor module's dedicated local startup area DLSA (FIG. 6). This operation is performed using the local start-up capability register LSCR (FIG. 4 and FIG. 6) with a micro-programme generated offset. The micro-programme unit $\mu$ PROG causes the capability register LSCR to be selected, over leads CRSEL in FIGS. 2*a* and 2*b* and opens gates G1 causing the base address of the DLSA segment to be passed to the MILL. At the same time leads GOS will carry the offset required to define the interrupt accept bit mask word address and the MILL will be instructed to perform an ADD operation. The result of the add operation will be passed over the main highway MHW to the memory input data register SDIREG by opening gates G2.

In accordance with the philosophies of the memory protection system provided by the concept of segment descriptors held in capability registers, as described in co-pending British application No. 25245/70, it is necessary for the memory address, which has just been placed in the memory data input register SDIREG, to be checked against the bounds of the dedicated local startup segment and for the access required to be checked against that which is permitted. The microprogramme unit $\mu$ PROG causes gates G3 and G4 to be opened at this stage causing the comparator COMP to make the above mentioned checks and allowing the memory input control signal highway SIHCS to be presented with a READ code. The comparator COMP is instructed to perform the required comparisons by the activation of the comparator micro-control signals C$\mu$S and it will indicate the successful operation of the check over leads CIS to the micro-programme unit $\mu$ PROG. When the successful check is indicated thereto the microprogramme unit $\mu$PROG opens gates G5 and activates a timing wire of the control signal highway SIHCS to cause the read operation to be performed.

When the memory has read out the interrupt accept bit mask word IMW it will activate a timing wire in the memory output control signal highway SOHCS and this will cause the micro-programme unit to open gates G6 and G7 allowing the interrupt accept mask word to be fed into the mask register MSK REG. The processor module now performs step S2 of the flow diagram of FIG. 7.

Step S2 – Access SIW Read-modify

This step causes the system interrupt word SIW (FIG. 6) to be accessed for a "read-modify write" operation. This operation has the effect of locking the storage module of the memory in which the system interrupt word resides to this processor module until the write operation is performed. The write operation will be perfomred in either step S5 or step S9 to be described later. The broken line box in FIG. 7, referenced SMLP (storage module locked period), indicates the duration of the locking of the storage module. This arrangement of course is necessary to prevent any other of the processor modules in a modular data processing system from accessing the system interrupt word at this time.

The micro-programme unit $\mu$ PROG will select (over leads CRSEL) the interrupt capability register ICR (FIG. 4 and 6) and the memory will be accessed for the "read-modify-write" operation by opening gates G1, G2, G3, G4 and G5 with the bounds check and access check arrangements mentioned above performed using the ICR segment descriptor. In FIG. 6 (at the top) the common storage area, in which the system interrupt word SIW resides, is shown as consisting of a number of words. In certain circumstances, depending upon the number of system interrupt bits required, a number of words may be necessary and in such circumstances a corresponding number of interrupt accept bit mask words IMW will also be required in the dedicated local start-up area for the processor modules. However, for ease of presentation at this time, it will be assumed that there is only one system interrupt word SIW and the limit value of the ICR capability register will therefore be equal to the base and only one IMW word would be provided in each DLSA. Consideration of the multiple SIW word arrangement will be made later. When the system interrupt word SIW is read-out from the memory it will be passed, under microprogramme control by opening gates G6 and G8, into the operand register OP REG. At the same time gates G8A are opened allowing the states of the two "timer zero" toggles to be set into the most significant bits of the operand register. It was mentioned above that bits 23 and 24 of the system interrupt word SIW (shown cross-hatched in FIG. 6) were not used as active bits and they are effectively used by the internal timer registers ITR and STR respectively. Hence if the interrupt sequence was started because of the exhausting of either of these counters, rather than the occurrence of the 100$\mu$S interrupt state interrogate pulse, the operand register (i.e. system interrupt word) will now define this state in addition. The processor module at this stage has the system interrupt word SIW in its operand register OPREG and its own current interrupt accept mask word in the mask register MSK REG. Step S3 will now be performed.

Step S3 — MERGE SIW & IMW

In this step the micro-programme unit opens gates G9 and G10 and G11 and instructs the MILL to AND merge the two words presented to its input ports. These operations cause a word to be written into the result register RES REG which will have marked conditions (i.e. in the '1' state) in those bits for which there is a mark in both the system interrupt word SIW and the interrupt accept mark word. Any bits marked in the system interrupt word bit having a corresponding bit in the '0' state in the interrupt accept mask word will be written as a '0' in the result register RES REG. Step S4 is now performed.

Step S4 - Merge result = 0 ?

In this step gates G12 will be opened and the MILL will be instructed to interrogate the applied word to see if it is zero. If all zero's are present in the applied word, step S5 will be performed as the system interrupt word does not contain any currently acceptable interrupt demands as far as the processor module is concerned. However if one or more bits are in the '1' state in the result register RES REG step S6 will be performed to accept the interrupt demand.

Step S5 - Write SIW Back

This step, which is only performed if no acceptable interrupt demands are present, when complete ends the locked period for the read-modify-write operation of the memory. The micro-programme unit $\mu$PROG will open gates G10, G2 and G5 allowing the system interrupt word SIW to be written back to the memory unaltered.

Step S6 - Correlate Merge Res.

In this step the micro-programme unit $\mu$PROG opens gates G12 and instructs the MILL to perform a correlate function. When performing a correlate function the MILL scans the word presented, from the most significant bit towards the least significant bit, until the first '1' state bit is found. The result is a number representing the bit position found.

Steps S7 and S8

The result of step S6 is placed in the interrupt accept word register IAR in the ACC STK by opening gates G13 (step S7 in FIG. 7) and the "selected" bit is also reset in the operand register OPREG or the relevent timer toggle ITRZ or STRZ is reset. This latter reset arrangement (Step S8 in FIG. 7) is not shown in FIGS. 2*a* and 2*b* for ease of presentation, however, it will be appreciated by those skilled in the art that the arithmetic unit indication signals AUIS may be used to perform the required resetting operation in the operand register OPREG or to control the reset of the timer zero indicator toggles ITRZ or STRZ.

Step S9 - Write SIW Back

The operations in this step are the same as those of step S5 above although it must be pointed out that the system interrupt word SIW will be written back to the memory with the accepted interrupt demand bit reset. The completion of the operations of this step will "free" the storage module in which the system interrupt word SIW resides for interrogation by any of the other processor modules of the system.

Step S10 - Dump Params of Current PROC.

At this stage the processor module has only inhibited the operations of the process it was performing prior to the generation of signal IIS and having now accepted an interrupt demand it is necessary for the processor to perform a "change process" operation to preserve in the memory the parameters of the inhibited process and to extract from the memory the parameters of the interrupt handler programme. These operations are performed in this step and in steps S11, 12 and 13.

It was mentioned previously that each programme is provided with a so-called dump area segment (as shown at the bottom of FIG. 6) and this segment is defined by the segment descriptor in the dump capability register DCR in the processor module. Each dump area segment contains information about the state of the currently running process, such as the values of the reserved segment pointers (RSP) corresponding to each of the work-space capability registers WCRO to WCR5. These locations in the dump area segment are loaded with the corresponding RS pointer whenever a capability register is loaded as is shown in co-pending British application No. 25245/70. However, the dump area segment is also used to store the contents of the registers of the ACC STK and the RS pointers for the current programme segment capability register WCR7 and the current programme's main reserved segment pointer table WCR6 together with the value of the sequence control register SCR, when the current process (programme) is changed (i.e. suspended). FIG. 6 shows the layout of the process dump area and during the "change process" sequence step S10 causes the contents of each of the accumulator ACCO to ACC7 and the current setting of the scheduler timer register STR and the contents of the primary (arithmetic and fault) indicator register PI's to be dumped. The actual operations performed in the processor module require: (i) the forming of the first dump area address by selecting (over leads CRSEL) the DCR base address and accessing the memory (by opening gates G1, G2, G3, G4 and G5 with the usual bounds/access check arrangements) at the dump area, the dump area address is also saved, in the result register RES REG (by opening gates G11 at the same time as gates G2 are opened) for successive dump area accesses and (ii) the passage of the relevant register contents (over gates G14, G2 and G5) for each relevant entry in the ACC STK with the updating by one of the access address (opening gates G12 and G11 and instructing the MILL to perform an add 1 operation). The above (i) and (ii) referenced operations are repeated for each of the first ten entries in the dump area.

Also located in the dump area is a push-down pointer PDP and the value in this location relates to the remaining area "below" it in FIG. 6 of the dump area segment which is operated as a "push-down" portion. The value in the push-down pointer defines the currently accessible three word "packet" in the push-down portion and it is an offset from the base of the dump area segment. The contents of the push-down pointer PDP is written into the "dump stack push-down pointer" register DSPRR (FIG. 3) in the ACC STK when the corresponding process (programme) is selected for processing by the processor module. This pointer register DSPPR is then usen when calling or returning from nested subroutines and the nesting of these subroutines is provided for by the three word packets of the push-down portion of the dump stack. Each packet contains the RS pointers for capability registers WCR7 and WCR6 together with the relativised value of the SCR. Hence step S10 also accommodates the loading of the push-down stack pointer PDP in the dump area with the corresponding value from the pointer register DSPPR.

Step S11 – Access New Dump Pointer, Read

In a normal programme controlled "change process" sequence the processor module will be provided, in the corresponding instruction word, with the offset down the reserved segment pointer table which is used to access the master capability table to obtain the dump area segment for the process (programme) to which the change is to be made. However, in the current situation the change process sequence is automatic (i.e. as a result of accepting a system interrupt demand) and consequently the dump area segment for the interrupt handler process must be obtained in a different manner. Reference to FIG. 6 will show the dedicated local start-up area segment which is particular to the processor module and this is referenced by the segment descriptor in the local start-up capability register LSCR. This local start-up area segment is arranged to include an interrupt handler process dump area pointer IDAP, together with the permitted access type code therefore. Step S11 uses this pointer to obtain the addresses in the master capability table which store the bounds and sum-check codes for the interrupt handler process dump area segment. The actual operations performed are the same as those used for any "load capability register" operation as described in the above-mentioned co-pending British application with the exception that the micro-programme unit μPROG of FIG. 2b defines the dump capability register DCR, over its selection leads CRSEL, into which the segment descriptor is to be loaded. The actual loading of the dump area capability register will be performed in step S 12 of the flow diagram of FIG. 7.

Step S13 – Undump IHP Params

In this step the newly loaded dump area capability register DCR, which now of course contains the dump area segment descriptor of the interrupt handler process, is used to copy the various parameters of this process into the relevant registers of the processor module. FIG. 6 at the bottom shows the layout of the dump area segment. Each of the capability registers WCRO to WCR7 is loaded by using the dump area stored RS pointer to access the master capability table in a similar manner to that shown in co-pending British application No. 25245/70 and the absolute value of the SCR will be derived when it is loaded by the addition of the base address value from WCR7.

Enter interrupt handler process

Upon the completion of the operations of step S13 the change process to the interrupt handler operation is complete. However, it is necessary for the interrupt handler process to be aware of the interrupt accepted and this is achieved by reference to the code which was placed in the interrupt accept word register IAR in the ACC STK in step S7 above. It will be noted that the contents of this register are not involved in the dumping or undumping process of steps S10 and S13.

At the start of the interrupt handler it may be necessary for that process to be made non-interruptable and this can be achieved by clearing one of the accumulator registers in the ACC STK and then performing a Q SWAP R instruction.

Q SWAP R Instruction

Referring to FIG. 5 the instruction word for this instruction is arranged to define (i) a store operation S (bit 24 = 1), (ii) modification using the contents of the register in the ACC STK defined by the coding of M if necessary, (iii) the register previously cleared (by the setting of the SR bits) (iv) a SWAP function code (FC), (v) a work-space capability register (defined by the code in WCRS) which holds a segment descriptor defining the dedicated local start-up area segment DLSA for the particular processor module and (vi) an offset (OS) which points to the interrupt mask word IMW in that area. The instruction therefore arranges to write all zero's into the interrupt mask word IMW and to write the Original IMW into the cleared register thereby ensuring that no interrupt demands will be accepted during the interrupt handler process. The interrupt handler will end with another Q SWAP R instruction defining the same registers and memory location thereby returning the original mask word to the local start-up area segment.

Conclusions

From the above description of a single embodiment of the invention it may be seen that the invention has provided a very flexible but simple interrupt system for use in a modular computer system. By the provision of a common system interrupt word the handling of for example any input-output transfer interrupt demand by any of the processor modules is accommodated and by the provision of an interrupt demand accept mask each processor module may be made selectively responsive to one or more of these demands. The provision of an interrupt demand accept register in each processor module has the two-fold advantage of providing a convenient programme switch address for use in the interrupt handler programme and allows the permitted access code for the local start-up area to be read-only as far as the local start-up capability register is concerned. This latter point ensures that the local start-up area cannot be corrupted by a fault in the processor when executing a complex object programme for example. The only programmes which write into this local start-up area are control programmes, such as the interrupt handler, and these programmes can be arranged to be fully secure.

Finally it was mentioned previously that the specific embodiment of the invention assumes that the system interrupt word and the interrupt demand accept word were in fact one computer word in size although a situation could be envisaged where more than one computer word was required due to the large number of devices in the modular system. In such a case the AND merging of the system interrupt word by the interrupt demand accept mask words would be performed in step S6 of FIG. 7 a word at a time and the correlation result would not only store the accepted bit count but also the accepted word count. Also it has been assumed that each system interrupt word bit is dedicated to a particular module or peripheral device. However this is not to be construed as a limitation as it will be appreciated by those skilled in the art that for example an input-output module could be instructed to set a particular bit when a particular data transfer has been completed and the interrupt handler programme can then be arranged to search for the module which has been so instructed to define which transfer has been completed. Other alternative arrangements will be seen by those skilled in the art and it must be realised that the above description is of one embodiment only and is not intended to be limiting to the inventive concepts. For example in certain small systems it may be that the peripheral transfer traffic is not sufficient to warrant the use of a discrete input-output module and in such cases the peripheral units may access the memory by way of the processor modules which will act as input-output modules when handling peripheral transfers.

Reference to "Understanding Digital Computers" by Paul Siegal published by John Wiley & Sons, Inc., New York and "Digital Computer Components and Circuits" by R.K. Richards published by D. Van Nostrand & Company, Inc., New York, will provide typical examples of equipment suitable for use in the block elements shown in FIGS. 2a and 2b of the drawings with the exception of the scratch-pad memory stacks and the micro-programme control unit in its read-only memory form. Reference to chapter 16 of "Semiconductor Memories" edited by Jerry Eimbinder and published by John Wiley & Sons, Inc., New York, however, provides information on typical location (on line) addressable random-access memories ideally suited to the fabrication of scratch-pad memory stack. Chapter 14 of the same publication provides information on the fabrication of a micro-programme control unit using read-only memory elements. The intercommunication medium may be of any suitable form typically on the lines of that shown in FIG. III of the article entitled "Why Multi-Computers" by Walter F. Bauer in the Dec. 1962 issue of Datamation. Alternatively the intercommunication medium may take the form envisaged by U.S. Pat. No. 3,345,618.

What we claim is:

1. A data processing system comprising in combination:

- a plurality of processor units;
- a plurality of peripheral units;
- a memory having addressable locations for storing data words and program instruction words and including a system interrupt storage area for the storage of a plurality of interrupt demand indicating bits, there being one such bit in said storage area allocated to each processor unit and each peripheral unit on a mutually exclusive basis, and means for setting said demand indicating bit when a processor or a peripheral unit is required to generate a system interrupt;
- a communication medium providing intercommunication between said memory and said processor and peripheral units;
- each said processor unit being provided with interrupt apparatus including an interrupt interrogate pulse generator for periodically producing an interrupt interrogate pulse to activate (i) nine means for inhibiting the operations currently being performed by the associated processor unit, (ii) nine means for addressing said memory at said storage area and interrogating the state of the bits therein and (iii) nine means for detecting a set interrupt indicating bit, said interrupt apparatus further including interrupt acceptance means activated by the detection of a set interrupt demand indicating bit and operable to control the processor unit in the execution of interrupt handling operations.

2. A data processing system according to claim 1 wherein said memory also includes a plurality of dedicated local storage areas each of which is particular to one of said processor units, each dedicated local storage area including storage for an interrupt accept bit mask, defining the interrupt demands which are currently to be acceptable to the particular processor unit to which the local storage area is dedicated, and said interrupt apparatus includes comparing means for comparing the states of said interrupt demand indicating bits with the states of the pertinent interrupt accept bit mask to ascertain if any of the interrupt demand indicating bits currently acceptable to said particular processor unit are set before operating said interrupt acceptance means.

3. A data processing system according to claim 2 wherein said interrupt apparatus includes an interrupt accept word computing means which computes a code indicative of one of said acceptance interrupt demand indicating bits.

4. A data processing system according to claim 3 wherein said interrupt apparatus includes set bit reset means responsive to the code in said interrupt accept register and operable to reset the set bit in said storage area corresponding to said code.

5. A data processing system comprising in combination:

a plurality of processor units;

a plurality of peripheral units;

a memory having a plurality of storage modules each including addressable locations for storing data and program instructions and one of said storage modules includes a system interrupt storage area for the storage of a plurality of interrupt demand indicating bits, there being one such bit in said storage area allocated on a mutually exclusive basis to each processor unit and each peripheral unit, and means for setting said demand indicating bit when a processor or a peripheral unit is required to generate a system interrupt;

a communication medium providing intercommunication between said memory and said processor and peripheral units;

each said processor unit being provided with interrupt apparatus including an interrupt interrogate pulse generator for periodically producing an interrupt interrogate pulse to activate, (i) nine first means for inhibiting the operations currently being performed by the associated processor unit, (ii) nine second means for addressing said memory at said storage area and reading the state of the bits therein, (iii) nine third means for detecting a set interrupt indicating bit, (iv) nine fourth means for registering a code indicative of a selected one of said set interrupt indicating bits and (v) nine fifth means for resetting said selected one of said set interrupt indicating bits;

and memory module locking means for preventing access to said one of said storage modules, during the period of operation of said second, third and fifth means, by any other processor or peripheral unit of the system.

6. A data processing system according to claim 5 wherein each processor unit is provided with a pair of time counters, a first of said counters being arranged to define information indicative of the length of time spent on processing the current operations while a second of said counters is arranged to define information indicative of the length of time elapsed since a particular control operation was performed and each said processor unit includes first and second internal interrupt demand indicating devices which are switched to the demand state when said first and second registers respectively reach a pre-determined state of count and said interrupt pulse generator is activated immediately by means responsive to said internal interrupt demand indicating devices.

7. A data processing system according to claim 6 wherein said memory also includes a plurality of dedicated local storage areas each of which is particular to one of said processor units, each dedicated local storage area including storage for an interrupt accept bit mask, defining the interrupt demands which are currently to be acceptable to the particular processor unit to which the local storage area is dedicated and said second means reads the states of all said interrupt demand indicating bits from said storage area into an internal register in said processor unit together with the states of said first and second internal interrupt demand indicating devices and a mask register is provided in each processor unit into which the appropriate interrupt bit mask is read and comparison means are provided in said processor unit to merge the information in said internal register with the information in said mask register.

8. A data processing system according to claim 7 wherein said processor units include means for correlating the result of the merging of the information in said internal register with the information in said mask register and the result of the correlation is written into an interrupt accept register.

* * * * *

UNITED STATES PATENT OFFICE
CERTIFICATE OF CORRECTION

Patent No. 3,757,307 Dated September 4, 1973

Inventor(s) David C. Cosserat, et. al.

It is certified that error appears in the above-identified patent and that said Letters Patent are hereby corrected as shown below:

Claim 1, Col. 16, lines 37, 39 and 42 "nine" should be --a--

Claim 5, Col. 17, lines 27, 30, 32, 33 and 35 "nine" should be --a--

Signed and sealed this 20th day of August 1974.

(SEAL)
Attest:

McCOY M. GIBSON, JR.
Attesting Officer

C. MARSHALL DANN
Commissioner of Patents